(12) United States Patent
Nemoto

(10) Patent No.: US 8,602,091 B2
(45) Date of Patent: Dec. 10, 2013

(54) STRUCTURE FOR AIR-COOLING VEHICLE-MOUNTED OBJECT

(75) Inventor: Atsuki Nemoto, Toyota (JP)

(73) Assignee: Tyota Jidosha Kabushiki Kaisha, Toyota-shi, Aichi (JP)

( * ) Notice: Subject to any disclaimer, the term of this patent is extended or adjusted under 35 U.S.C. 154(b) by 696 days.

(21) Appl. No.: 12/440,344

(22) PCT Filed: Sep. 5, 2007

(86) PCT No.: PCT/JP2007/067292
§ 371 (c)(1),
(2), (4) Date: Mar. 6, 2009

(87) PCT Pub. No.: WO2008/029837
PCT Pub. Date: Mar. 13, 2008

(65) Prior Publication Data
US 2010/0193174 A1 Aug. 5, 2010

(30) Foreign Application Priority Data
Sep. 6, 2006 (JP) .................. 2006-241922

(51) Int. Cl.
*B60H 1/00* (2006.01)
*B60H 3/00* (2006.01)
*B61D 27/00* (2006.01)

(52) U.S. Cl.
USPC ............... 165/202; 165/271; 165/41; 165/42; 165/43; 165/44

(58) Field of Classification Search
USPC ............ 165/202, 271, 41, 42, 43, 44; 62/244, 62/241, 291; 180/68.1, 68.2; 454/69, 75, 454/103, 104, 105, 106
See application file for complete search history.

(56) References Cited

U.S. PATENT DOCUMENTS 4,401,013 A * 8/1983 Ohashi et al. .................. 454/140
5,524,446 A * 6/1996 Hotta et al. ...................... 62/179
(Continued)

FOREIGN PATENT DOCUMENTS

DE 199 08 502 5/2000
JP 63-41226 2/1988
(Continued)

OTHER PUBLICATIONS

Extended European Search Report for EP Appl. No. 07806735.2 dated Apr. 4, 2011.

*Primary Examiner* — Mohammad M Ali
*Assistant Examiner* — Ian Soule
(74) *Attorney, Agent, or Firm* — Finnegan, Henderson, Farabow, Garrett & Dunner, LLP

(57) ABSTRACT

There is provided an air-cooling structure for a vehicle-mounted object is capable of taking in a sufficient amount of air. The top end of an air suction part 36 is opened extremely near an air deflector 20 behind the air deflector 20. With this, an air flow W4 prevented from flowing to a vehicle compartment space 12 by the air deflector 20 is introduced to the top end of the air suction part 36 and flows into the interior of the air suction part 36. In this manner, the air flow W4 flowing at a speed corresponding to the running speed of a vehicle 10 flows into the interior of the air suction part 36, so that even though the air flow W4 is the outside air, the air flow W4 can effectively air-cool a battery 34 installed in a battery housing part 32.

17 Claims, 6 Drawing Sheets

(56) References Cited

U.S. PATENT DOCUMENTS

| | | | | |
|---|---|---|---|---|
| 5,673,747 | A | * | 10/1997 | Kousaka et al. ............... 165/41 |
| 5,950,722 | A | * | 9/1999 | Huetteman ................. 165/202 |
| 6,213,865 | B1 | * | 4/2001 | Odebrecht .................. 454/151 |
| 6,220,383 | B1 | * | 4/2001 | Muraki et al. ............... 180/68.5 |
| 6,261,173 | B1 | * | 7/2001 | Odebrecht .................. 454/151 |
| 6,341,814 | B1 | * | 1/2002 | Honninger et al. ........... 296/208 |
| 6,772,834 | B2 | * | 8/2004 | Iwamoto et al. ............. 165/271 |
| 2001/0045278 | A1 | | 11/2001 | Iwamoto et al. |
| 2003/0118891 | A1 | | 6/2003 | Saito et al. |
| 2004/0010357 | A1 | | 1/2004 | Kubota et al. |
| 2005/0011640 | A1 | * | 1/2005 | Tohda et al. ................. 165/202 |
| 2005/0061498 | A1 | | 3/2005 | Tohda et al. |

FOREIGN PATENT DOCUMENTS

| | | |
|---|---|---|
| JP | 3-3062 | 1/1991 |
| JP | 4-19317 | 2/1992 |
| JP | 2001-328416 | 11/2001 |
| JP | 2003-178815 | 6/2003 |
| JP | 2005-75216 | 3/2005 |
| JP | 2005-88752 | 4/2005 |
| JP | 2006-12471 | 1/2006 |
| JP | 2006-15862 | 1/2006 |
| JP | 2006-117096 | 5/2006 |
| JP | 2006-224906 | 8/2006 |
| WO | WO 2005/092650 | 10/2005 |

* cited by examiner

STRUCTURE FOR AIR-COOLING VEHICLE-MOUNTED OBJECT

CROSS-REFERENCE TO RELATED APPLICATIONS

This application is a national phase application of International Application No. PCT/JP2007/067292, filed Sep. 5, 2007, and claims the priority of Japanese Application No. 2006-241922, filed Sep. 6, 2006, the contents of both of which are incorporated herein by reference.

TECHNICAL FIELD

The present invention relates to an air-cooling structure for an object mounted in a rear portion of a vehicle having its roof removably mounted, that is, a so-called "open car".

BACKGROUND ART

In a so-called "hybrid vehicle" provided with an electrically driven motor for driving a vehicle separately from an engine, in some cases, a battery (electric power source) for the electrically driven motor is mounted in a trunk room of the vehicle as disclosed for example, in Japanese Patent Application Laid-open (JP-A) No. 2005-88752. Moreover, in the above document, a construction is disclosed that a cooling duct is disposed in a rear parcel part for separating a vehicle compartment from the trunk room. The cooling duct has its one end opened in the interior of the vehicle compartment and has its other end connected to the trunk room. Air sucked from one end of the cooling duct (interior of the vehicle compartment) by a cooling fan passes through the cooling duct and is supplied into the trunk room, and the battery is cooled by the air supplied into the trunk room.

DISCLOSURE OF THE INVENTION

Subjects that the Invention is to Address

In a state where a roof is removed in the "open car" in which the roof is removably mounted, the outside air is taken in to cool a battery in a trunk room. However, as compared with a case where air in a vehicle compartment is used to cool the battery in the vehicle provided with the roof, the temperature of the outside air is higher and, especially in summer, it is difficult to acquire an enough amount of intake of air (amount of air) to cool the battery sufficiently.

Means for Addressing the Subjects

In consideration of the above-mentioned fact, the subject of the invention is to provide an air-cooling structure for a vehicle-mounted object capable of taking in a sufficient amount of air.

To address the above-mentioned subject, the first aspect of the present invention is an air-cooling structure for a vehicle-mounted object. The air-cooling structure is applied to a vehicle having a removable roof portion and the roof portion covering a vehicle compartment space from above. The vehicle has a mounted object installation space which is formed in an interior of the vehicle and is located at the back of the vehicle compartment space. The air-cooling structure for the vehicle-mounted object includes an air suction part and an air flow introducing unit. The air suction part has its one end opened behind a seat disposed along a rear end of the vehicle compartment space and has its other end connected to the mounted object installation space such that air flows from the one end to the other end of the air suction part. The air flow introducing unit is disposed in front of the one end of the air suction part and directs an air flow, which has passed above the vehicle compartment space and is flowed forward in the front and rear direction and downward in the upper and lower direction of the vehicle, to the one end of the air suction part.

According to the air-cooling structure for a vehicle-mounted object of the first aspect of the invention, the one end of the air suction part is opened behind the seat disposed along the rear end of the vehicle compartment space, and the air flow introducing unit is disposed in front of the one end of the air suction part. An air flow which has passed above the vehicle compartment space and is flowed in forward and downward of the vehicle while the vehicle is running is introduced to the one end of the air suction part by the air introducing unit, thereby the air flows from the one end to the other end side of the air suction part, that is, the air flows into the mounted object installation space. The vehicle-mounted object placed in the mounted object installation space is air-cooled by the air flow flowing in this manner.

The air flow introduced by the air flow introducing unit flows at a speed corresponding to a running speed of the vehicle and passes through the air suction part. Thus, the air-cooling structure can take in a sufficient amount of air and can air-cool the vehicle-mounted object.

The air-cooling structure for a vehicle-mounted object according to a second aspect of the invention is, in the first aspect of the invention, the air flow introducing unit is an air deflector that is provided near the seat disposed along the rear end of the vehicle compartment space and prevents the air flow from flowing into the vehicle compartment space, and directs the air flow to the one end of the air suction part.

According to the air-cooling structure for a vehicle-mounted object of the second aspect of the invention, while the vehicle is running, air flow passes above the vehicle compartment space. Further, the air flow passing above the vehicle compartment space flows so as to be flowed forward in the vehicle front and rear direction and downward in the vehicle upper and lower direction. The air flowing in this manner is prevented from flowing into the vehicle compartment space by the air deflector. Thus, it is possible to prevent a vehicle occupant' hair from being disturbed by the air flowing into the vehicle compartment space.

Further, the air prevented from flowing into the vehicle compartment space is directed to the one end of the air suction part by the air deflector. With this, the air flows into the mounted object installation space from the one end of the air suction part via the other end side thereof. The vehicle-mounted object installed in the mounted object installation space can be air-cooled by the air flow in this manner.

The air deflector is disposed between the vehicle compartment space and the one end of the air suction part to prevent the air from flowing into the vehicle compartment space and to direct the air flow to the one end of the air suction part. Thus, the noises caused when the air flow is sucked by the air suction part can be prevented from being transmitted to the vehicle compartment space. As a result, silence in the vehicle compartment space can be ensured or enhanced.

An air-cooling structure for a vehicle-mounted object according to a third aspect of the invention is applied to a vehicle that has a removable roof portion, the roof portion covering a vehicle compartment space from above, and the vehicle has a mounted object installation space formed in an interior of the vehicle and located at the back of the vehicle compartment space. The air-cooling structure for a vehicle-mounted object includes an air suction part and an air deflector. The air deflector is provided near a seat disposed along a rear end of the vehicle compartment space, prevents an air from flowing into the vehicle compartment space, and the air flow has passed above the vehicle compartment space and is flowed forward in the front and rear direction and downward in the upper and lower direction of the vehicle. The air suction part has its one end opened behind the air deflector, has its other end connected to the mounted object installation space, such that air flows from the one end to the other end of the air suction part.

According to the air-cooling structure for a vehicle-mounted object of the third aspect, while the vehicle is running, the air flow passes above the vehicle compartment space. Further, the air flow passing above the vehicle compartment space flows forward in the vehicle front and rear direction and downward in the vehicle upper and lower direction. The air flowing in this manner is prevented from flowing into the vehicle compartment space by the air deflector.

Further, the one end of the air suction part is opened behind the air deflector, and the air prevented from flowing into the vehicle compartment space flows into the mounted object installation space from the one end of the air suction part via the other end side thereof. The vehicle-mounted object is air-cooled by the air flow flowing into the mounted object installation space in this manner.

The air flow having its direction changed by the air deflector and flowing into the mounted object installation space flows at a speed corresponding to the running speed of the vehicle and passes through the air suction part. Thus, the air-cooling structure can take in a sufficient amount of air and air-cool the vehicle-mounted object.

The air-cooling structure for a vehicle-mounted object according to a forth aspect of the invention is, in the third aspect of the invention, the seat is disposed such that occupants may be seated side by side in a vehicle width direction along the rear end of the vehicle compartment space, and the air deflector is disposed between a left side seating position and a right side seating position in the vehicle width direction of the seat.

According to the air-cooling structure for a vehicle-mounted object of the forth aspect, the air deflector that prevents the air from flowing into the vehicle compartment space and directs the air flow into the one end of the air suction part is disposed between the left and right side seated positions in the vehicle width direction of the seat disposed along the rear end of the vehicle compartment space. For this reason, the air-cooling structure can prevent or inhibit the air from flowing between the seated positions of the left and right sides of the seat and can inhibits the noises caused when the air flows into the air suction part from being transmitted to occupants sat at the left and right side seated positions of the seat.

The air-cooling structure for a vehicle-mounted object according to a fifth aspect of the invention in the first to fourth aspects of the invention, an other end side of the air suction part is provided to incline farther forward in the front and rear direction and farther downward in the upper and lower direction of the vehicle than a one end side of the air suction part.

According to the air-cooling structure for a vehicle-mounted object of the fifth aspect of the invention, the air flow passing above the vehicle compartment space is flowed forward in the front and rear direction and downward in the upper and lower direction of the vehicle. Since the other end side of the air suction part is provided to incline farther forward in the front and rear direction and farther downward in the upper and lower direction of the vehicle than the one end side of the air suction part, a direction toward the other end from the one end of the air suction part is along the direction of the air flow. With this, the air flows smoothly from the one end side of the air suction part to the other end side thereof, whereby the air flow flowing though the air suction part increases.

The air-cooling structure for a vehicle-mounted object according to a sixth aspect of the invention, in the first to fifth aspects of the invention, includes a forced air-suction unit that is disposed between the one end and the other end of the air suction part and is operated to suck air at the one end side of the air suction part, and sends the air to the other end side of the air suction part.

According to the air-cooling structure for a vehicle-mounted object of the sixth aspect of the invention, when the forced air-suction unit is operated, air is taken in from the one end of the air suction part. Further, the air taken in by the forced air-suction unit is sent to the mounted object installation space via the other end of the air suction part. With this, even when a vehicle running speed is decreased so that the speed of the air flow decreases or the vehicle is stopped so that the air flow is not generated, the cooling air can be supplied to the mounted object installation space and air-cool the mounted object.

The air-cooling structure for a vehicle-mounted object according to a seventh aspect of the invention, in the sixth aspect of the invention, further includes a roof detecting unit that detects whether or not the roof portion covers the vehicle compartment space and the air suction part from above; and a control unit that controls the forced air-suction unit on the basis of a signal from the roof detecting unit and the forced air-suction unit is operated when the roof portion is mounted to cover the vehicle compartment space.

According to the air-cooling structure for a vehicle-mounted object of the seventh aspect of the invention, when the roof detecting unit detects that the roof portion is brought into a state that the roof portion is mounted, the control unit controls the forced air-suction unit to be operated on the basis of the signal outputted from the roof detecting unit. With this, air in a space covered by the roof portion (that is, a space in the vehicle compartment) is taken in via the air suction part and is sent to the vehicle-mounted object installation space.

When the vehicle is brought into the state that the roof portion is mounted and the vehicle compartment space and the air suction part are covered from above by the roof portion, even if the vehicle is running, an air flow is blocked by the roof portion and is not sucked by the air suction part. However, in this aspect, even if the roof portion is mounted and hence the air flow cannot be introduced into the air suction part, the mounted object can be air-cooled by the air in the space of the vehicle compartment.

Still further, the air-cooling structure for a vehicle-mounted object according to a eighth aspect of the invention, in the sixth and seventh aspects of the invention, includes a speed detecting unit that detects a vehicle speed and a control unit that controls the forced air-suction unit on the basis of a signal from the speed detecting unit and the forced air-suction unit is operated when the vehicle speed is smaller than a specified value.

According to the air-cooling structure for a vehicle-mounted object of the eighth aspect of the invention, when the speed detecting unit detects that the running speed of the vehicle is decreased or the vehicle is stopped so that the running speed of the vehicle becomes smaller than the specified value, the control unit controls the forced air-suction unit to be operated on the basis of the signal outputted from the speed detecting unit. With this, the air can be forcibly sent to the mounted object installation space via the other end of the air suction part.

When the running speed of the vehicle is decreased, the speed of the air flow is also decreased. Moreover, the air flow is generated by the vehicle running, so that when the vehicle is stopped, the air flow is not generated. However, in the air-cooling structure according to this aspect of the invention, even if the vehicle running speed is decreased or the vehicle is stopped and hence a sufficient amount of air flow cannot be introduced into the air suction part, the air can be sent into the mounted object installation space to air-cool the vehicle-mounted object.

Still further, the air-cooling structure for a vehicle-mounted object according to a ninth aspect of the invention, in the fifth to eighth aspects of the invention, a foreign matter trapping channel having a top end portion thereof open between the one end and the other end of the air suction part such that a foreign matter sliding down along an inclined surface of the air suction part drops into the foreign matter trapping channel.

According to the air-cooling structure for a vehicle-mounted object of the ninth aspect of the invention, since the air suction part is inclined, the foreign matter such as a water drop coming into the air suction part from the one end thereof slides down along the inclined surface of the air suction part. The top end of the foreign matter trapping channel is opened between the one end and the other end of the air suction part, so that the foreign matter sliding down along the inclined surface of the air suction part drops in the foreign matter trapping channel before the foreign matter reaches the other end of the air suction part.

Thus, the foreign matter does not reach the other end of the air suction part or rarely reaches the other end of the air suction part. With this, the air-cooling structure for a vehicle-mounted object can effectively prevent foreign matter affection, for example, a water drop or the like coming into the air suction part from the one end thereof wets the mounted object installed in the mounted object installation space.

Still further, the air-cooling structure for a vehicle-mounted object according to a tenth aspect of the invention, in the ninth aspect of the invention, the top end portion of the foreign matter trapping channel is provided at the inclined surface of the air suction part and substantially at a position where the top end portion of the foreign matter trapping channel does not overlap a one end portion of the air suction part in the upper and lower direction of the vehicle.

According to the air-cooling structure for a vehicle-mounted object of the tenth aspect of the invention, the top end portion of the foreign matter trapping channel does not overlap the one end portion of the air suction part in the upper and lower direction of the vehicle. For this reason, the foreign matter passing through the one end portion of the air suction part is rarely arrived at the other end side of the air suction part instead of the top end portion of the foreign matter trapping channel, so that the foreign matter can be surely trapped by the foreign matter trapping channel.

Still further, the air-cooling structure for a vehicle-mounted object according to an eleventh aspect of the invention, in the first to tenth aspects of the invention, the air suction part is provided such that the one end thereof is opened at a portion of the vehicle compartment space covered by the roof portion when the roof portion is mounted.

According to the air-cooling structure for a vehicle-mounted object of the eleventh aspect of the invention, when the roof portion is mounted, that is, the vehicle compartment space is covered by the roof portion, the one end of the air suction part is opened at the vehicle compartment space side. For this reason, when the roof portion is mounted, the conditioned air already cooled by a vehicle air-conditioning device can be taken in from the one end of the air suction part. With this, even when the roof portion is mounted, the vehicle-mounted object placed in the mounted object installation space can be effectively air-cooled.

Still further, as described up to this point, when the roof portion is not mounted, the air flowing at a speed corresponding to the vehicle running speed can be taken in from the one end of the air suction part to effectively air-cool the vehicle-mounted object installed in the mounted object installation space. According to the air-cooling structure for a vehicle-mounted object of the present aspect, either in the state where the roof portion is mounted or removed, even if the air taken in from the one end of the air suction part is not cooled, the air can effectively air-cool the vehicle-mounted object. Accordingly, an air cooling unit such as an evaporator does not need to be provided.

Still further, the air-cooling structure for a vehicle-mounted object according to a twelfth aspect of the invention, in the first to eleventh aspect of the invention, includes an air exhausting part one end thereof connected to the mounted object installation space and the other end thereof open near a position where an air flowing along the vehicle separately from the air flow directed to the one end of the air suction part.

According to the air-cooling structure for a vehicle-mounted object of the twelfth aspect of the invention, the air introduced into the mounted object installation space from the air suction part cools the mounted object installation space and is exhausted from the air exhausting part. The other end of the air exhausting part (that is, the end portion of the air exhausting part opposite to the mounted object installation space) is opened near a position where the air flowing along the vehicle separately from the air flow directed to the one end of the air suction part passes. Accordingly, the air sent to the other end of the air exhausting part flows out into the air flowing near the other end of the air exhausting part. In this manner, as the air in the exhaust part is flown into the air flowing near the other end of the exhaust part, the air exhausting part effectively exhausts the air. Thus, this can further improve taking in the air by the air suction part and hence cooling of the mounted object can be enhanced.

Effect of the Invention

As described above, according to the air-cooling structure for a vehicle-mounted object of the first aspect of the invention, a sufficient amount of air can be taken into the mounted object installation space to air-cool the mounted object installed in the mounted object installation space.

According to the air-cooling structure for a vehicle-mounted object of the second aspect of the invention, even when sound is produced when the air flow is sucked into the air suction part, this sound can be prevented from being transmitted to the mounted object installation space. Thus, silence in the vehicle compartment space can be ensured or enhanced.

Still further, according to the air-cooling structure for a vehicle-mounted object of the third aspect of the invention, a sufficient amount of air can be taken into the mounted object installation space to air-cool the mounted object installed in the mounted object installation space.

Still further, according to the air-cooling structure for a vehicle-mounted object of the forth aspect of the invention, the sound produced when the air flows into the air suction part can be prevented from being transmitted to the occupants on the left and right side seated positions of the seat.

Still further, according to the air-cooling structure for a vehicle-mounted object of the fifth aspect of the invention, the air flow can be made to smoothly flow from the one end to the other end of the air suction part to increase the air flow flowing through the air suction part. Thus, the mounted object installed in the mounted object installation space can be further excellently air-cooled.

Still further, according to the air-cooling structure for a vehicle-mounted object of the sixth aspect of the invention, when the forced air-suction unit is operated, the air is taken in from the one end of the air suction part. The air taken in by the forced air-suction unit is sent to the mounted object installation space via the other end of the air suction part. With this, even when the speed of the air flow is decreased or the air flow is stopped, the cooling air is supplied to the mounted object installation space and can air-cool the mounted object.

Still further, according to the air-cooling structure for a vehicle-mounted object of the seventh aspect of the invention, even when the roof portion is mounted and hence the air flow cannot be introduced into the air suction part, the air in the vehicle compartment space can air-cool the mounted object.

Still further, according to the air-cooling structure for a vehicle-mounted object of the eighth aspect of the invention, even when the running speed of the vehicle is decreased or the vehicle is stopped and hence a sufficient amount of air cannot be introduced into the air suction part, the air can be sent into the mounted object installation space to air-cool the mounted object.

Still further, according to the air-cooling structure for a vehicle-mounted object of the ninth aspect of the invention, the foreign matter coming in from the one end side of the air suction part can be prevented or effectively prohibited from coming into the mounted object installation space. Thus, the mounted object installed in the mounted object installation space can be prevented or effectively prohibited from being affected with the foreign matter.

Still further, according to the air-cooling structure for a vehicle-mounted object of the tenth aspect of the invention, the foreign matter coming in from the one end side of the air suction part can be further effectively prevented or prohibited from coming into the mounted object installation space.

Still further, according to the air-cooling structure for a vehicle-mounted object of the eleventh aspect of the invention, irrespective of whether or not the roof portion is mounted, even if the air taken in from the one end of the air suction part is not cooled, the air can effectively air-cool the vehicle-mounted object. Thus, an air cooling unit such as an evaporator does not need to be provided.

Still further, according to the air-cooling structure for a vehicle-mounted object of the twelfth aspect of the invention, the effect of exhausting the air by the air exhausting part can be enhanced, so that the sucking of air by the air suction part can be further improved and hence can enhance cooling the mounted object.

BEST MODE FOR CARRYING OUT THE INVENTION

Construction of First Embodiment

Figure 1:
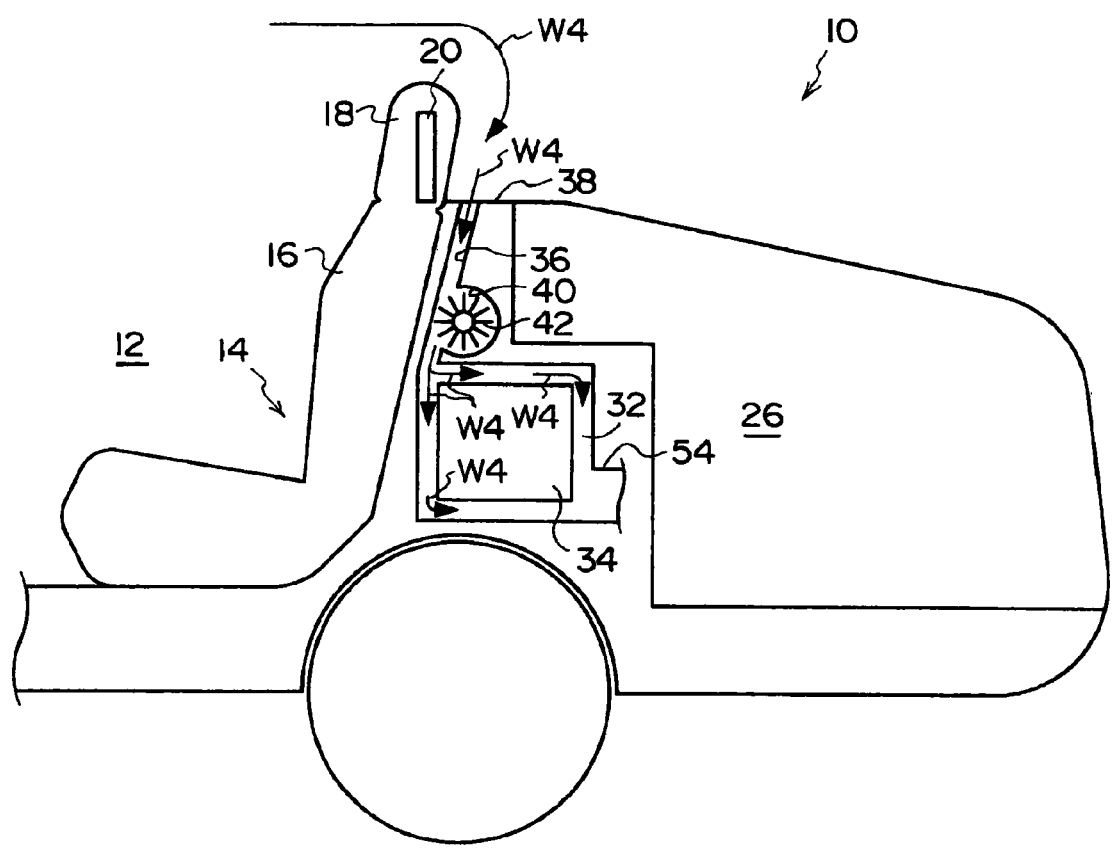
FIG. 1 is a schematic side section view of a vehicle to which an air-cooling structure for a vehicle-mounted object according to a first embodiment of the present invention is applied.

In FIG. 1, a schematic structure of a vehicle (open car) 10 to which a vehicle-mounted battery cooling structure as an air-cooling structure for a vehicle-mounted object according to a first embodiment of the present invention is shown by a side sectional view. As shown in this drawing, in a vehicle compartment space 12 of the vehicle 10, a seat 14 is disposed along a rear end portion of the vehicle compartment space 12. When the vehicle 10 is a so-called "two seater car" in which a driver and a passenger can get on, this seat 14 is a driver's seat or a passenger's seat, whereas when the seat 14 is disposed backward of the driver's seat and the passenger's seat, the seat 14 is a rear seat. As shown in FIG. 1, a head rest 18 is disposed on the top side of a seat back 16 constructing this seat 14.

Figure 3:
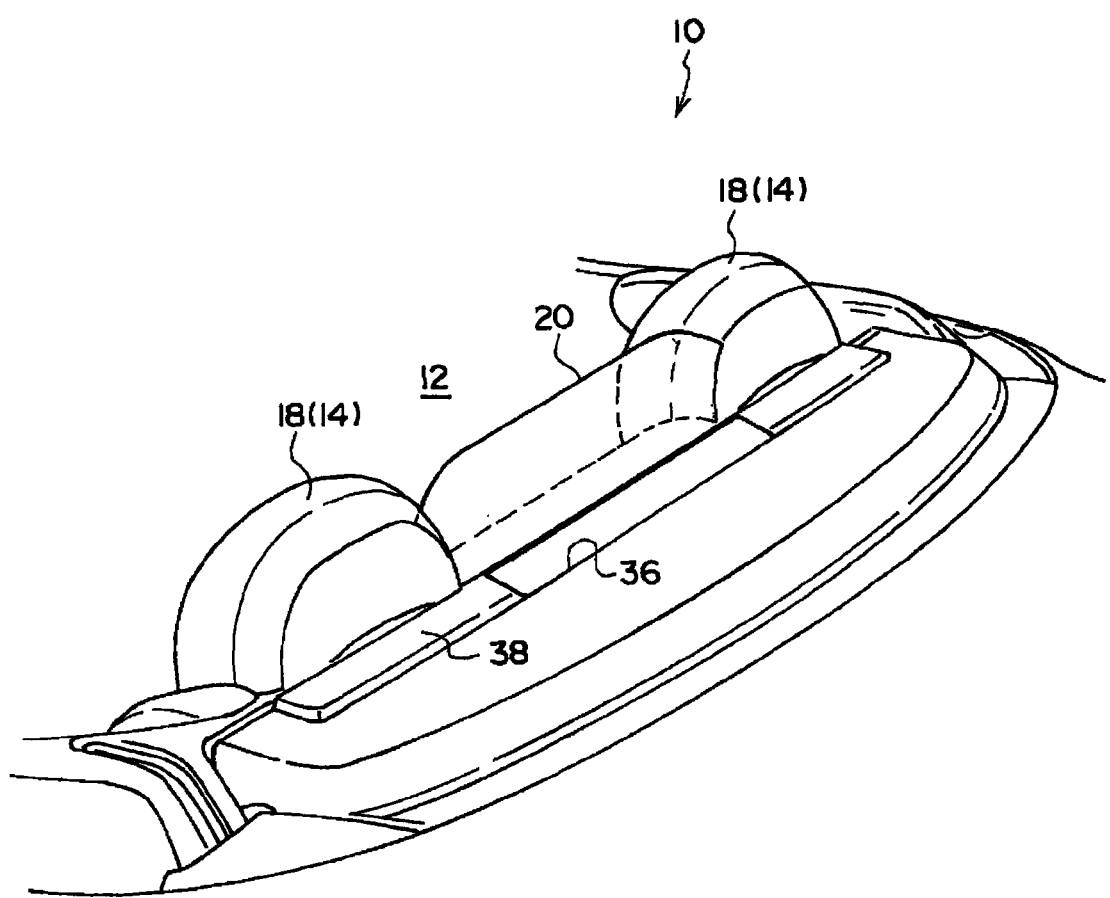
FIG. 3 is a schematic perspective view, when viewed from obliquely rearward, of the vehicle to which the air-cooling structure according to the first embodiment of the invention is applied.
Figure 4:
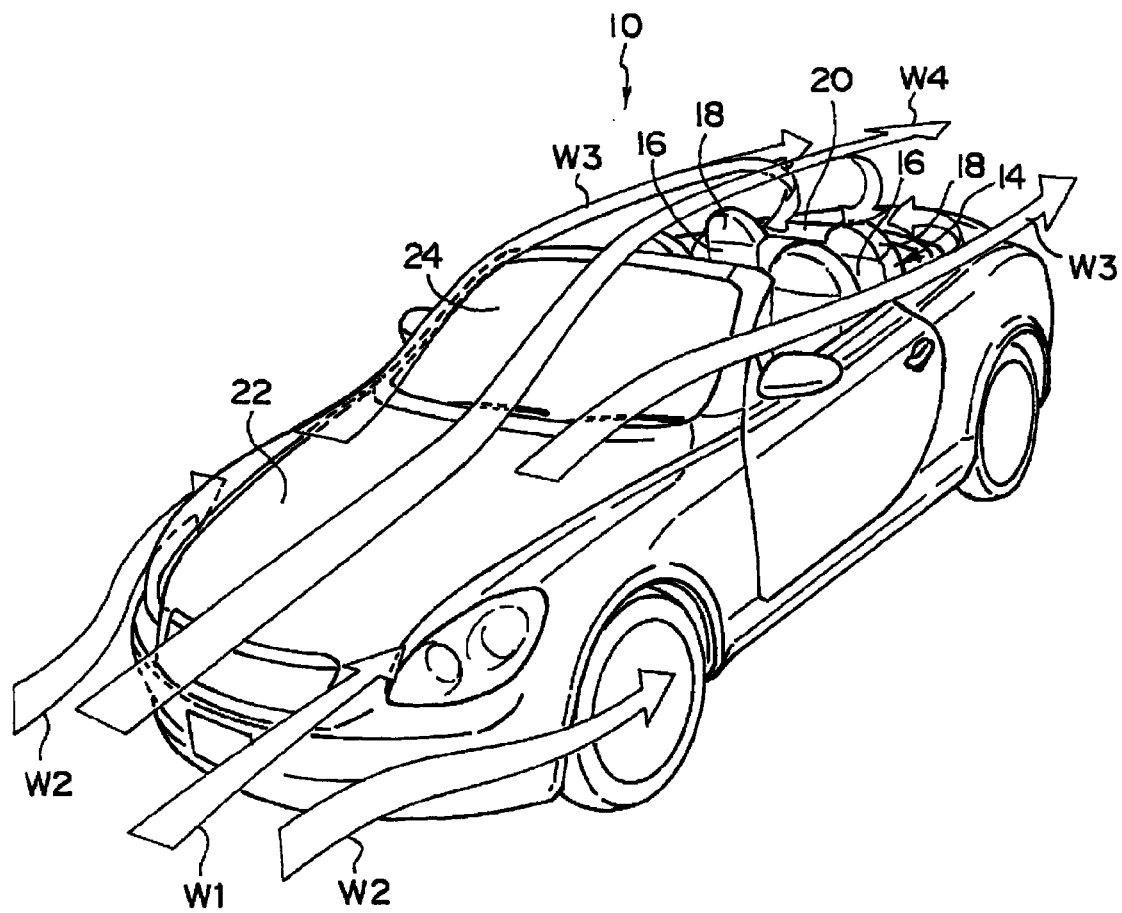
FIG. 4 is a schematic perspective view, when viewed from obliquely forward, of the vehicle to which the air-cooling structure according to the first embodiment of the invention is applied.

As shown in FIG. 3, the head rest 18 is disposed on the left and right portions along a width direction of the vehicle 10, respectively. A plate-shaped air deflector 20, which constructs an air flow introducing unit in this embodiment and is disposed in the thickness direction along a front and rear direction of the vehicle 10, is disposed between the head rests 18 disposed side by side in the width direction. As shown in FIG. 4, while the vehicle 10 is running, an air flow W1 passing below the vehicle 10, an air flow W2 flowing along the side of the vehicle 10, an air flow W3 flowing from the top of a bonnet 22 of the vehicle 10 to the side of the vehicle 10 via the surface of a window shield glass 24, and an air flow W4 passing from the top of the bonnet 22 to the top of the vehicle 10 via the surface of the window shield glass 24 flow.

Of these air flows W1 to W4, a portion or all of the air flow W3 flows, at the back of the vehicle compartment space 12, so as to be flown inward in the width direction and forward in the front and rear direction of the vehicle 10. Moreover, a portion or all of the air flow W4 flows, at the back of the vehicle compartment space 12, so as to be flown forward in the front and rear direction and downward in the upper and lower direction of the vehicle 10. These air flows W3 and W4 flow in the manner described above thus flow toward the vehicle compartment space 12. These air flows W3 and W4 may disturb the hair of an occupant in the vehicle compartment space 12 to give the occupant an unpleasant feeling. By disposing the air deflector 20 between the left and right head rests 18 in the width direction of the vehicle 10, the above-mentioned air flows W3, W4 are prevented from flowing into the inside of the vehicle compartment space 12 from between the left and the right head rests 18.

Moreover, a deflector housing part (not shown) for housing the air deflector 20 is disposed below the left and right head rests 18. The air deflector 20 can be reciprocated by the driving force of a driving unit such as a motor between a state in which the air deflector 20 is housed in the deflector housing part (state shown in FIG. 2, although the deflector housing part is not shown) and a state in which the air deflector 20 is located between the left and right head rests 18 in the width direction of the vehicle 10.

Figure 2:
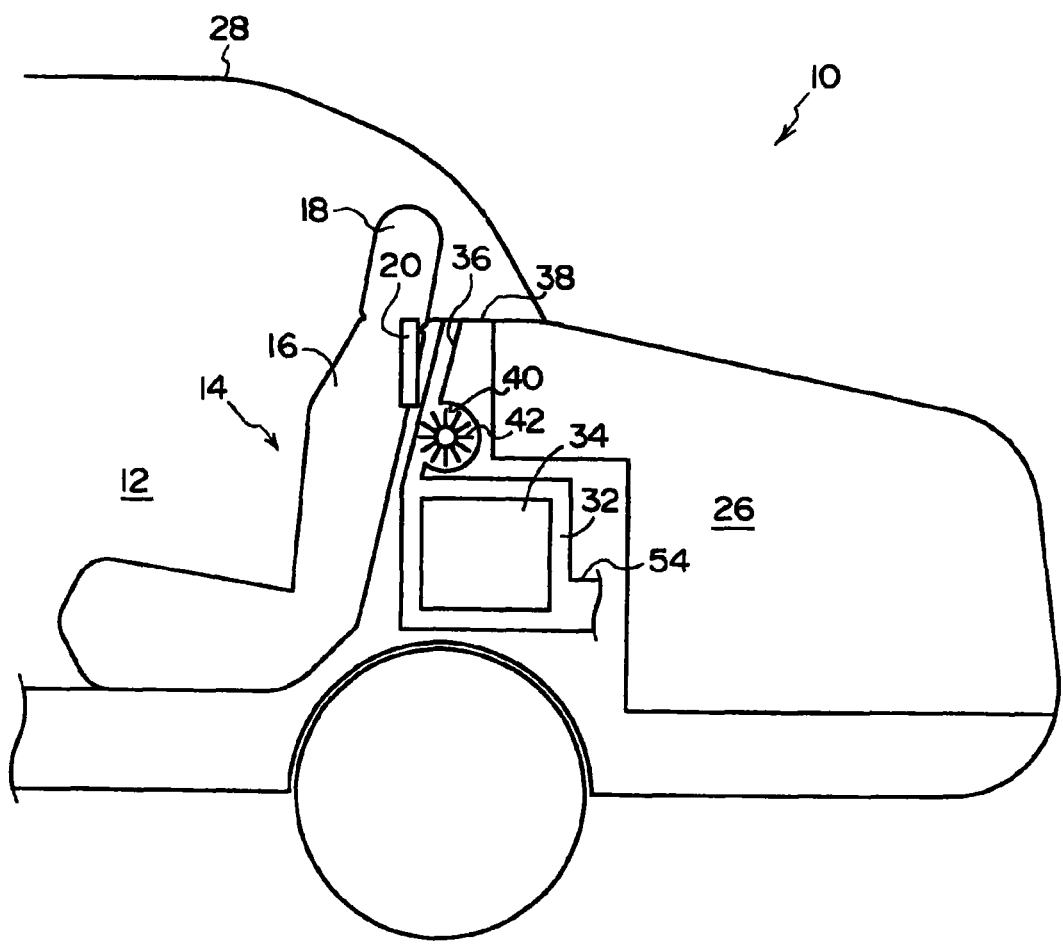
FIG. 2 is a schematic side section view of a vehicle corresponding to FIG. 1 in a state in which a roof portion is mounted.
Figure 5:
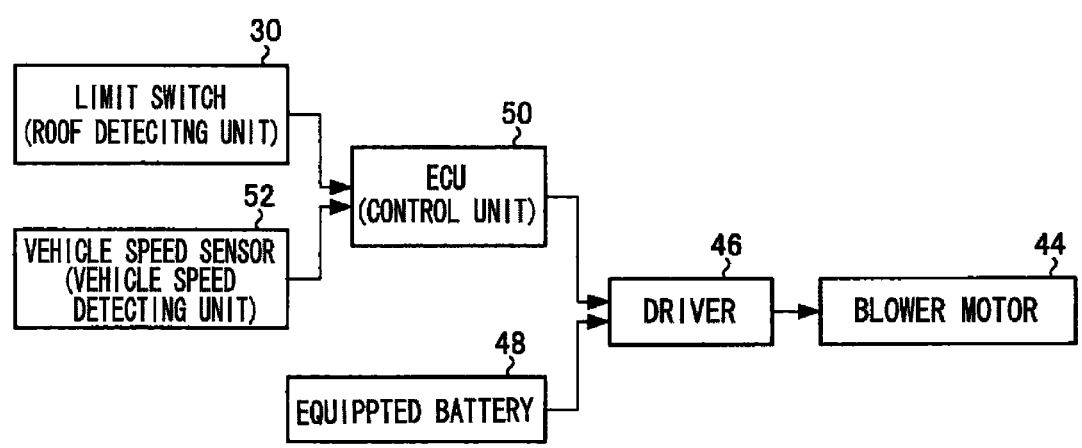
FIG. 5 is a block diagram to schematically show a construction for controlling a blower motor.

A trunk room 26 is disposed rearward of the vehicle compartment space 12 of the vehicle 10. In an open state shown in FIG. 1, a folding roof 28 as a roof portion (see FIG. 2) is housed in a folded state in the trunk room 26 (in FIG. 1, the folding roof 28 is omitted). The trunk room 26 can be opened or closed by a driving force of a driving unit such as a motor, and the folding roof 28 can be folded and housed and can be developed and mounted by the same motor for opening or closing the trunk room 26 or by a separate motor. As shown in FIG. 2, when the folding roof 28 is mounted so as to cover the top of the vehicle compartment space 12, a limit switch 30 as a roof detecting unit shown in FIG. 5 is switched from an OFF state to an ON state.

Moreover, as shown in FIG. 1, a battery housing part 32 as a mounted object installation space is formed between the vehicle compartment space 12 and the trunk room 26, and a battery 34 is housed (installed) in this battery housing part 32. The battery 34 is a mounted object for driving an electric motor for driving the vehicle 10 separately from an engine. A bottom end (other end) of an air suction part 36 is opened at the top of the battery housing part 34. The air suction part 36 has its top end (one end) opened at rearward side than the bottom end (the other end) of the air suction part 36. The top end (the one end) of the air suction part 36 opens at a position behind the air deflector 20 between the left and right head rests 18 in the width direction of the vehicle 10 at a rear seat backup upper garnish 38.

A blower housing part 40 is formed between the top end and the bottom end of the air suction part 36, and an air suction blower 42 as a forced air-suction unit is housed in this blower housing part 40. The air suction blower 42 is rotated by the driving force of a blower motor 44 shown in FIG. 5 to take in air from a one end side of the air suction part 36 to send the air to the other end thereof. As shown in FIG. 5, the blower motor 44 is electrically connected to an equipped battery 48 via a driver 46 and is electrically connected to an ECU 50 as a control unit and controls electric power to be supplied to the blower motor 44 by the driver 46 on the basis of a blower driving signal outputted from the ECU 50.

Moreover, the ECU 50 is electrically connected to the limit switch 30 and determines whether or not the folding roof 28 is mounted on the top of the vehicle compartment space 12 on the basis of the state of the limit switch 30. Further, the ECU 50 is electrically connected to a vehicle speed sensor 52 of the vehicle 10 as a vehicle speed detecting unit and has an electric signal of a level corresponding to the running speed of the vehicle 10 inputted thereto.

As shown in FIG. 1, one end of an air exhausting part 54 is opened at the battery housing part 32. The other end of the air exhausting part 54 is opened at a specified position of the vehicle 10, for example, in the trunk room 26 or in the vehicle body side or the vehicle body bottom of the vehicle 10, and can exhaust air sent from the air suction part 36 into the battery housing part 32 to the outside of the battery housing part 32.

Operation and Effect of First Embodiment

In this embodiment described above, while the vehicle 10 is running in a state in which the folding roof 28 is removed, the above-mentioned air flows W1, W2, W3, and W4 flow along the vehicle body of the vehicle 10. Of these air flows W1 to W4, a portion or all of the air flow W3 flows so as to be flown inward in the width direction and forward in the front and rear direction of the vehicle 10 at the back of the vehicle compartment space 12. Moreover, a portion or all of the air flow W4 flows so as to be flown inward in the width direction and downward in the upper and lower direction of the vehicle 10 at the back of the vehicle compartment space 12. These air flows W3 and W4 flow in the manner described above and flow toward the vehicle compartment space 12.

When the air deflector 20 is pulled out from the deflector housing part to set the air deflector 20 between the left and right head rests 18 in the width direction of the vehicle 10, the air flows W3 and W4 are interfered by the air deflector 20. With this, the air flows W3 and W4 are prevented from flowing into the vehicle compartment space 12 from between the left and right head rests 18. In this manner, the air deflector 20 prevents the air flows W3 and W4 from disturbing the hair of an occupant in the vehicle compartment space 12.

The air flow W4 is interfered by the air deflector 20, thereby flows downward of the vehicle 10. The top end of the air suction part 36 is opened behind (rearward of) the air deflector 20, so that the air flow W4 flowing downward of the vehicle 10 flows into the interior of the air suction part 36 from the top end thereof and passes through the interior of the air suction part 36 and is sent into the battery housing part 32. In this manner, the air flow W4 is sent into the battery housing part 32 and flows in the battery housing part 32, whereby the battery 34 is cooled by the air.

As described above, the air flow W4 is the outside air and hence may be higher in temperature in many cases than an air conditioned by an air conditioner mounted in the vehicle (in particular, in summer). Thus, the effect of cooling the battery 34 by the outside air is generally smaller than the conditioned air, but in a state where the vehicle 10 is running, the air flow W4 flows at a speed corresponding to the running speed of the vehicle 10, so that the air flow W4 taken into the air suction part 36 is more sufficient in quantity than the conditioned air and is high in speed. For this reason, the battery 34 can be sufficiently cooled by the air flow W4 flowing into the battery housing part 32.

Moreover, as described above, the air flow W4 flows forward in the front and rear direction and downward in the upper and lower direction of the vehicle 10. The air suction part 36 is inclined in such a way that its top end is located further rearward side than the bottom end, so that the air suction part 36 is inclined along the direction of the air flow W4 interfered by the air deflector 20. Therefore, the air flow W4 flowing into the air suction part 36 from the top end part thereof flows smoothly without being greatly interfered by the inner wall of the air suction part 36. With this, a large amount of air flow W4 can be sent fast into the battery housing part 32, which can enhance cooling of the battery 34 by the air flow W4.

Further, the air deflector 20 is disposed at the position between the left and right head rests 18 in the width direction of the vehicle 10, and the position is located at an area where the air deflector 20 introduces the air flow W4 to the top end portion of the air suction part 36. Since the deflector 20 is disposed in this manner, the noise caused when the air flow W4 is sucked into the air suction part 36 is prevented from being transmitted to the vehicle compartment space 12. With this, silence in the vehicle compartment space 12 can be ensured or enhanced.

When the running speed of the vehicle 10 becomes slow than a specified value or the vehicle 10 stops, the ECU 50 outputs a driving signal on the basis of an electric signal from the vehicle speed sensor 52 in this state. The ECU 50 starts to supply electric power to the blower motor 44 on the basis of this driving signal, whereby the blower motor 44 is driven.

Further, when the folding roof 28 is mounted so as to cover the top of the vehicle compartment space 12, the limit switch 30 is switched from the OFF state to the ON state. In this state, the ECU 50 outputs a driving signal on the basis of the electric signal from the limit switch 30. The ECU 50 starts to supply electric power to the blower motor 44 on the basis of this driving signal, whereby the blower motor 44 is driven.

When the blower motor 44 is driven in this manner, the air suction blower 42 is rotated and air is taken in from the top end of the air suction part 36 and is forcibly sent to the battery housing part 32. With this, even if the running speed of the vehicle 10 is decreased so as to decrease the speed of the air flow W4, the vehicle 10 is stopped, or the folding roof 28 is mounted to cause the air flow W4 being stopped, the cooling air is supplied to the battery housing part 32 and hence the battery 34 can be cooled.

Still further, as shown in FIG. 2, when the folding roof 28 covers the top of the vehicle compartment space 12, the top end of the air suction part 36 is opened in a space covered by the folding roof 28 (that is, within the vehicle compartment space 12). In this state, when the air conditioner mounted in the vehicle 10 is operated, the conditioned air the temperature of which is basically lower than the outside air flows into the vehicle compartment space 12, and this conditioned air is taken in from the top end portion of the air suction part 36 and is supplied to the battery 34 to cool it. Accordingly, even if the speed of the conditioned air flow is smaller than the speed of the air flow W4, the conditioned air can cool the battery 34 sufficiently.

Second Embodiment

Next, a second embodiment of the present invention will be described. Here, in the description of this embodiment, the fundamentally same parts as those of the first embodiment are denoted by the same reference numerals, and the detailed description of the parts will be omitted.

Figure 6:
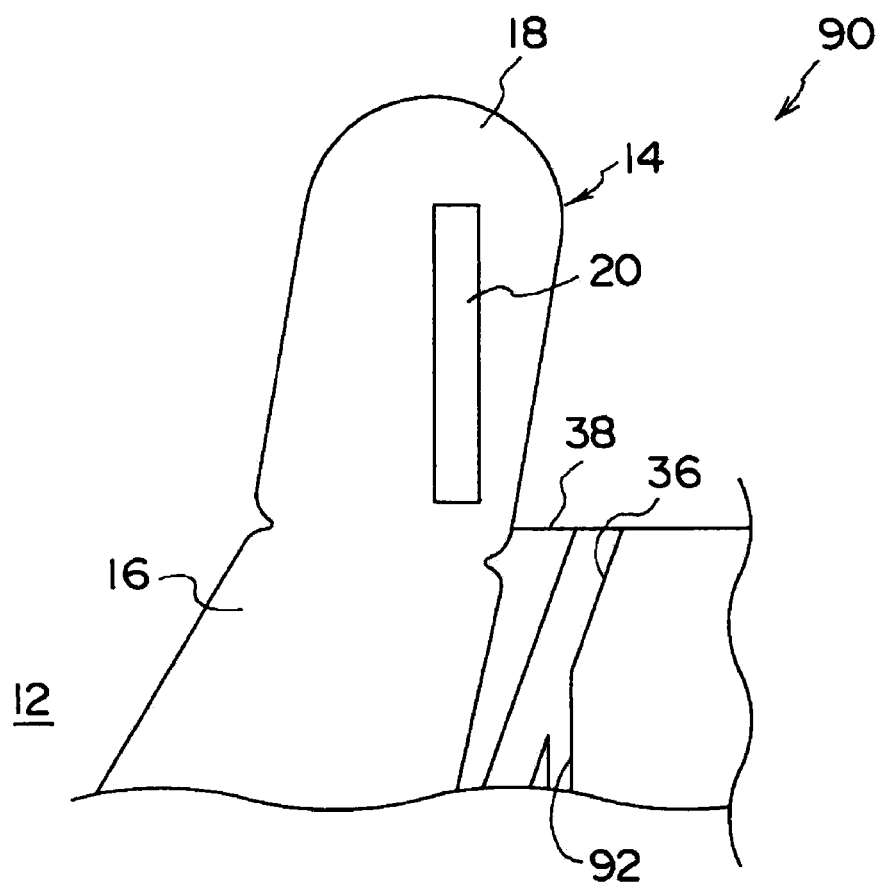
FIG. 6 is a schematic enlarged side section view of a vehicle to which an air-cooling structure for a vehicle-mounted object according to a second embodiment of the invention is applied.

In FIG. 6, a schematic structure of a vehicle (open car) 90 to which a vehicle-mounted battery cooling structure as an air-cooling structure for a vehicle-mounted object according to this embodiment is shown by a side sectional view.

As shown in this drawing, the vehicle 90 is provided with a trap drain 92 as a foreign matter trapping channel. The trap drain 92 has its top end portion opened in an inclined surface of the air suction part 36 between the top end portion and the bottom end portion of the air suction part 36. Moreover, the trap drain 92 has its bottom end portion opened in a portion other than the battery housing part 32 and the trunk room 26, for example, in the side portion or in the bottom portion of the vehicle body.

In a state where the folding roof 28 is housed in the trunk room 26, the top end portion of the air suction part 36 is opened to the outside of the vehicle compartment of the vehicle 10. Thus, a foreign matter such as a rain drop may come into the air suction part 36 from the top end portion thereof. Since the air suction part 36 is inclined, the foreign matter coming into the air suction part 36 drops on the inclined surface of the air suction part 36 and further falls slidingly on the inclined surface. When the foreign matter sliding on the inclined surface comes to the top end portion of the trap drain 92 in this manner, the foreign matter does not further slide on the surface of the air suction part 36 but drops downward in the trap drain 92.

Accordingly, in this embodiment, it is extremely unlikely that the foreign matter will reach the battery housing part 32. With this, for example, even when the rain falls unexpectedly when the folding roof 28 is housed in the trunk room 26, it is extremely unlikely that the rain water will attach to the battery 34. With this, it is possible to prevent or effectively inhibit the quality of the battery 34 from being deteriorated with the rain water. Moreover, when the top end portion of the trap drain 92 is formed at a position closer to the top end of the air suction part 36 than the blower housing part 40, the air suction blower 42 and the blower motor 44 can be prevented from being spoiled by the rain water.

Note that, when the top end portion of the trap drain 92 is opened in the inclined surface of the air suction part 36, the position where the top end portion of the trap drain 92 is formed is not limited to a particular position. Instead, the trap drain 92 is formed in such a way that the top end portion of the air suction part 36 does not overlap the top end portion of the trap drain 92 in the upper and lower direction of the vehicle 10. With this configuration, the foreign matter such as rain water passing over the top end portion of the air suction part 36 does not arrive at a lower side at the air suction part 36 than the top end portion of the trap drain 92 before the foreign matter reaches a lower portion of the inclined surface of the air suction part, so that the foreign matter can be surely trapped by the trap drain 92.

Further, the position of the other end portion of the air exhausting part 54 is not described in the respective embodiments, but when the other end portion of the air exhausting part 54 is opened, for example, near a position where the air flow W1 and the air flow W2 pass, the air sent near the other end portion of the air exhausting part 54 is flown into the air flow W1 and the air flow W2, so that the effect of exhausting the air by the air exhausting part 54 can be enhanced. With the improvement of exhausting in the air exhausting part 54, the air intake by the air suction part 36 can be further increased, which can hence enhance the effect of cooling the battery 34.

Still further, in the above-mentioned respective embodiments, the invention is applied to the cooling of the battery 34, but an object to be cooled according to the invention is not limited to the battery 34. The invention is also applicable for objects that are mounted in the vehicle 10 or 90 and need to be cooled.

Still further, in the above-mentioned respective embodiments, the battery housing part 32 as the mounted object installation space is formed separately from the trunk room 26. However, the mounted object installation space does not need to be formed separately from the trunk room 26 (that is, the trunk room 26 may be the mounted object installation space). In other words, any spaces in which an object to be cooled such as the battery 34 is installed are to be the mounted object installation space.

The invention claimed is:
1. An air-cooling structure for cooling a battery applied to a vehicle, the vehicle comprising a removable roof portion covering a vehicle compartment space from above, and a battery housing part formed in an interior of the vehicle and located at a rear of the vehicle compartment space, the air-cooling structure comprising:
    an air suction part having a first end thereof opened behind a seat disposed along a rear end of the vehicle compartment space and having a second end thereof fluidly connected to the battery housing part such that, in an open state in which the top of the vehicle compartment space is open by removing the roof portion from the vehicle compartment space, air flows from the first end to the second end through the air suction part, and the air suction part being provided with a forced air-suction unit;

an air flow introducing unit disposed in front of the first end of the air suction part and, in the open state, configured to direct an air flow, which has passed above the vehicle compartment space, to flow forward in a vehicle front and rear direction and downward in a vehicle upper and lower direction of the vehicle, to the first end of the air suction part; and a foreign matter trapping channel provided separately from the air suction part;

wherein a second end side of the air suction part is provided to incline farther forward in the vehicle front and rear direction and farther downward in the vehicle upper and lower direction than a first end side of the air suction part, and the foreign matter trapping channel has a top end portion branched off of the air suction part, the top end portion being open between the first end and the second end of the air suction part, and the top end portion being positioned above the forced air-suction unit, wherein a foreign matter sliding down along an inclined surface of the air suction part drops into the foreign matter trapping channel.

2. The air-cooling structure of claim 1,
wherein the air flow introducing unit is an air deflector that is disposed near the seat disposed along the rear end of the vehicle compartment space, prevents the air flow from flowing into the vehicle compartment space, and directs the air flow to the first end of the air suction part.

3. An air-cooling structure for cooling a battery applied to a vehicle, the vehicle comprising a removable roof portion covering a vehicle compartment space from above, and a battery housing part formed in an interior of the vehicle and located at a rear of the vehicle compartment space, the air cooling structure comprising:

an air deflector disposed near a seat disposed along a rear end of the vehicle compartment space, wherein the air deflector is configured to prevent an air flow, which has passed above the vehicle compartment space, from flowing into the vehicle compartment space;

an air suction part having a first end opened behind the air deflector, and a second end fluidly connected to the battery housing part, and in an open state in which the top of the vehicle compartment space is open by removing the roof portion from the vehicle compartment space, the air flow prevented from flowing into the vehicle compartment space by the air deflector can flow from the first end to the second end in the air suction part, and the air suction part being provided with a forced air-suction unit; and a foreign matter trapping channel provided separately from the air suction part;

wherein a second end side of the air suction part is provided to incline farther forward in the vehicle front and rear direction and farther downward in the vehicle upper and lower direction than a first end side of the air suction part, and the foreign matter trapping channel has a top end portion branched off of the air suction part, the top end portion being open between the first end and the second end of the air suction part, and the top end portion being positioned above the forced air-suction unit, wherein a foreign matter sliding down along an inclined surface of the air suction part drops into the foreign matter trapping channel.

4. The air-cooling structure of claim 3,
wherein the seat is one of a plurality of seats, wherein the plurality of seats are disposed such that occupants may be seated side by side in a vehicle width direction along the rear end of the vehicle compartment space, and the air deflector is disposed between a left side seating position and a right side seating position in the vehicle width direction of the seat.

5. The air-cooling structure according to claim 1, wherein the forced air-suction unit is disposed between the first end and the second end of the air suction part and is operated to intake air via suction at the first end side and send the air to the second end side of the air suction part.

6. The air-cooling structure of claim 5 further comprising:
a roof detecting unit that detects whether or not the roof portion covers the vehicle compartment space and the air suction part from above; and
a control unit that controls the forced air-suction unit on a basis of a signal from the roof detecting unit, and the forced air-suction unit is operated when the roof portion is mounted to cover the vehicle compartment space.

7. The air-cooling structure of claim 5, further comprising a speed detecting unit that detects a speed of the vehicle, and
a control unit that controls the forced air-suction unit on a basis of a signal from the speed detecting unit, and the forced air-suction unit is operated when the speed of the vehicle is smaller than a specified value.

8. The air-cooling structure of claim 1, wherein the top end portion of the foreign matter trapping channel is provided at the inclined surface of the air suction part and substantially at a position where the top end portion of the foreign matter trapping channel does not overlap a first end portion of the air suction part in the upper and lower direction of the vehicle.

9. The air-cooling structure according to claim 1, wherein the air suction part is provided such that the first end of the air suction part is open at a portion of the vehicle compartment space covered by the roof portion when the roof portion is mounted.

10. The air-cooling structure according to claim 1, further comprising an air exhaust part having one end connected to the battery housing part and an other end open near a position where another air flow passes, wherein-the air suction part is configured to direct the air flow toward the other end of the air exhaust part.

11. The air-cooling structure of claim 8, wherein the foreign matter trapping channel is provided such that an orientation thereof is substantially opposite to an orientation of the air suction part with respect to the vehicle front and rear direction.

12. The air-cooling structure according to claim 1, wherein the foreign matter trapping channel is disposed below the first end of the air suction part.

13. The air-cooling structure according to claim 3, wherein the foreign matter trapping channel is disposed below the first end of the air suction part.

14. The air-cooling structure according to claim 1, wherein the foreign matter trapping channel is configured to prevent the foreign matter from reaching the forced air suction unit.

15. The air-cooling structure according to claim 3, wherein the foreign matter trapping channel is configured to prevent the foreign matter from reaching the forced air suction unit.

16. The air-cooling structure according to claim 1, wherein the battery housing part houses the battery.

17. The air-cooling structure according to claim 3, wherein the battery housing part houses the battery.

* * * * *

UNITED STATES PATENT AND TRADEMARK OFFICE
CERTIFICATE OF CORRECTION

| | | |
|---|---|---|
| PATENT NO. | : 8,602,091 B2 | Page 1 of 1 |
| APPLICATION NO. | : 12/440344 | |
| DATED | : December 10, 2013 | |
| INVENTOR(S) | : Atsuki Nemoto | |

It is certified that error appears in the above-identified patent and that said Letters Patent is hereby corrected as shown below:

Title page, item (73) Assignee: "Tyota Jidosha Kabushiki Kaisha" should read --Assignee: Toyota Jidosha Kabushiki Kaisha--.

Signed and Sealed this
Fifth Day of August, 2014

Michelle K. Lee
*Deputy Director of the United States Patent and Trademark Office*